(12) United States Patent
Sun et al.

(10) Patent No.: US 11,746,299 B1
(45) Date of Patent: *Sep. 5, 2023

(54) METHODS AND SYSTEMS FOR UPGRADING MIXED PYROLYSIS OIL TO LIGHT AROMATICS OVER MIXED METAL OXIDE CATALYSTS

(71) Applicants: Saudi Arabian Oil Company, Dhahran (SA); SABIC Global Technologies B.V., PX Bergen op Zoom (NL)

(72) Inventors: Miao Sun, Dhahran (SA); Sohel K Shaikh, Dhahran (SA); Wojciech Andrzej Supronowicz, Riyadh (SA); Chandrasekar Subramani, Al Jubail (SA); Eman Z Albaher, Qatif (SA)

(73) Assignees: Saudi Arabian Oil Company, Dhahran (SA); SABIC Global Technology B.V., PX Bergen op Zoom (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/861,543

(22) Filed: Jul. 11, 2022

(51) Int. Cl.
  *C10G 47/04* (2006.01)
  *B01J 19/24* (2006.01)
  (Continued)

(52) U.S. Cl.
  CPC .............. *C10G 47/04* (2013.01); *B01J 19/24* (2013.01); *B01J 23/002* (2013.01); *B01J 23/83* (2013.01);
  (Continued)

(58) Field of Classification Search
  CPC .......................... C10G 47/02–04; C10G 69/06
  See application file for complete search history.

(56) References Cited

U.S. PATENT DOCUMENTS

| | | | |
|---|---|---|---|
| 3,099,617 | A | 7/1963 | Tulleners |
| 4,550,090 | A | 10/1985 | Degnan et al. |

(Continued)

FOREIGN PATENT DOCUMENTS

| | | |
|---|---|---|
| CN | 104355995 A | 2/2015 |
| CN | 106622354 A | 5/2017 |

(Continued)

OTHER PUBLICATIONS

Guerzoni et al. "Catalytic Cracking of a Hydrocarbon Mixture on Combinations of HY and HZSM-5 Zeolites" Chemistry Department, Journal of Catalysis 139, 289-303 (1993), 15 pgs.
(Continued)

*Primary Examiner* — Renee Robinson
(74) *Attorney, Agent, or Firm* — DINSMORE & SHOHL LLP (57) ABSTRACT

A method for upgrading mixed pyrolysis oil may include contacting the mixed pyrolysis oil with hydrogen in the presence of a mixed metal oxide catalyst at reaction conditions to produce a reaction effluent including light aromatic compounds. The mixed pyrolysis oil includes multi-ring aromatic compounds and is formed from light pyrolysis oil and heavy pyrolysis oil at a ratio of 10:90 to 40:60 with light pyrolysis oil representing a bottom stream of a gas steam cracker and heavy pyrolysis oil representing a bottom stream of a naphtha steam cracker. The mixed metal oxide catalyst includes a plurality of catalyst particles with each catalyst particles including a plurality of metal oxides. An associated system for upgrading mixed pyrolysis oil may include a pyrolysis upgrading unit housing the mixed metal oxide catalyst and a separation unit operable to separate used mixed metal oxide catalyst from the reaction effluent.

16 Claims, 3 Drawing Sheets

(51) Int. Cl.
  *B01J 23/00* (2006.01)
  *B01J 23/83* (2006.01)
  *C10G 69/06* (2006.01)
(52) U.S. Cl.
  CPC ..... *C10G 69/06* (2013.01); *C10G 2300/4006* (2013.01); *C10G 2300/4012* (2013.01); *C10G 2300/706* (2013.01); *C10G 2400/30* (2013.01)

(56) References Cited

U.S. PATENT DOCUMENTS

| | | | |
|---|---|---|---|
| 4,602,000 | A | 7/1986 | Dupin et al. |
| 6,531,051 | B1 | 3/2003 | Kasztelan et al. |
| 7,232,515 | B1 | 6/2007 | Demmin et al. |
| 9,217,114 | B2 | 12/2015 | Cortright et al. |
| 9,321,973 | B2 | 4/2016 | Marchand et al. |
| 10,118,163 | B1 | 11/2018 | Zhang |
| 10,751,709 | B1 | 8/2020 | Sun et al. |
| 10,751,710 | B1 | 8/2020 | Sun |
| 10,835,894 | B1 | 11/2020 | Sun et al. |
| 10,870,106 | B1 | 12/2020 | Sun |
| 10,953,396 | B2 | 3/2021 | Sun et al. |
| 11,027,271 | B2 | 6/2021 | Sun |
| 11,123,725 | B2 | 9/2021 | Sun et al. |
| 11,130,119 | B2 | 9/2021 | Sun |
| 2005/0070423 | A1 | 3/2005 | Kishan et al. |
| 2009/0171123 | A1 | 7/2009 | Glaser et al. |
| 2009/0173666 | A1 | 7/2009 | Zhou et al. |
| 2009/0314683 | A1 | 12/2009 | Matsushita |
| 2009/0321315 | A1 | 12/2009 | Bhattacharyya et al. |
| 2010/0314295 | A1 | 12/2010 | Sandstede et al. |
| 2012/0094879 | A1 | 4/2012 | Roberts et al. |
| 2012/0238792 | A1 | 9/2012 | Watson et al. |
| 2013/0143972 | A1 | 6/2013 | Townsend et al. |
| 2013/0164205 | A1 | 6/2013 | Putluru et al. |
| 2013/0178664 | A1 | 7/2013 | Zhou et al. |
| 2013/0245338 | A1 | 9/2013 | Weiner et al. |
| 2014/0021096 | A1 | 1/2014 | Chaumonnot et al. |
| 2014/0027346 | A1 | 1/2014 | Chaumonnot et al. |
| 2014/0130402 | A1 | 5/2014 | Kastner et al. |
| 2015/0231615 | A1 | 8/2015 | Bonduelle et al. |
| 2015/0274620 | A1 | 10/2015 | Zong et al. |
| 2017/0001180 | A1 | 1/2017 | Ravishankar et al. |
| 2017/0100710 | A1 | 4/2017 | Kim et al. |
| 2018/0142159 | A1 | 5/2018 | Kumar et al. |
| 2018/0290131 | A1 | 10/2018 | Carrette |
| 2018/0333708 | A1 | 11/2018 | Ding et al. |
| 2018/0334622 | A1 | 11/2018 | Agrawal et al. |
| 2019/0134616 | A1 | 5/2019 | Jae et al. |
| 2021/0001318 | A1 | 1/2021 | Sun et al. |
| 2021/0130715 | A1 | 5/2021 | Xu et al. |

FOREIGN PATENT DOCUMENTS

| | | | |
|---|---|---|---|
| FR | 3075663 | A1 | 6/2019 |
| WO | 0042127 | A1 | 7/2000 |
| WO | 2012085358 | A1 | 6/2012 |
| WO | 2013176277 | A1 | 11/2013 |
| WO | 2017207976 | A1 | 12/2017 |
| WO | 2018011642 | A1 | 1/2018 |
| WO | 2019197987 | A1 | 10/2019 |

OTHER PUBLICATIONS

Hanif et al. "Supported solid and heteropoly acid catalysts for production of biodiesel" Catalysis Reviews (2017) vol. 59, No. 2, 165-188, 24 pgs.

Jimenfz-Cruz et al. "Molecular size evaluation of linear and branched paraffins from the gasoline pool by DFT quantum chemical calculations" Science Direct, Fuel 83 (2004) 2183-2188, 7 pgs.

Kim et al. "Novel Ni2P/zeolite catalysts for naphthalene hydrocracking to BTX" Catalysis Communications 45 (2014) 133-138, 6 pgs.

Kim et al. "Morphology effect of b-zeolite supports for Ni2P catalysts on the hydrocracking of polycyclic aromatic hydrocarbons to benzene, toluene, and xylene" Journal of Catalysis 351 (2017) 67-78, 12 pgs.

Lapinas et al. "Catalytic Hydrogenation and Hydrocracking of Fluorene: Reaction Pathways, Kinetics, and Mechanisms" Ind. Eng. Chem. Res. 1991, 30, 42-50, 9 pgs.

Leite et al. "Hydrocracking of phenanthrene over bifunctional Pt catalysts" Catalysis Today 65 (2001) 241-247, 7 pgs.

Lemberton et al. "Catalytic hydroconversion of simulated coal tars" Applied Catalysis A: General, 79 (1991) 115-126, 12 pgs.

Matsui et al. "Explanation of Product Distribution of Hydrocracking Reaction of Aromatic Hydrocarbons with Nickel-Loaded Zeolites Based on CAMD Study on Interaction between Zeolites and Substrates" Energy & Fuels (1995) 9, 435-438, 4 pgs.

Okuhara et al. "Catalytic Chemistry of Heteropoly Compounds" Advances in Catalysis, Adv Cata vol. 41 (1996) 113, 140 pgs.

Park et al. "Mild hydrocracking of 1-methyl naphthalene (1-MN) over alumina modified zeolite" Journal of Industrial and Engineering Chemistry 19 (2013) 627-632, 6 pgs.

Tailleur et al. The effect of aromatics on paraffin mild hydrocracking reactions (WNiPd/CeY—Al2O3), Fuel Processing Technology 89 (2008) 808-818, 11 pgs.

Upare et al. "Cobalt promoted Mo/beta zeolite for selective hydrocracking of tetralin and pyrolysis fuel oil into monocyclic aromatic hydrocarbons" Journal of Industrial and Engineering Chemistry 35 (2016) 99-107, 9 pgs.

Upare et al. "Selective hydrocracking of pyrolysis fuel oil into benzene, toluene and xylene over CoMo/beta zeolite catalyst" Journal of Industrial and Engineering Chemistry 46 (2017) 356-363, 8 pgs.

Park et al. "Hydro-conversion of 1-methyl naphthalene into (alkyl)benzenes over alumina-coated USY zeolite-supported NiMoS catalysts" Fuel 90 (2011) 182-189, 8 pgs.

Technical Data Sheet, ACS Material Al-MCM-41, www.acsmaterial.com, no date available.

Wang, et al., "Performance Evaluation of "Ship-in-the-Bottle" Type Heteropoly Acid Encaged Y-Type Zeolite as Catalyst for Oxidative Desulfurization", collect. czech. commun. 2011, vol. 76, No. 12, pp. 1595-1605.

Pasoni et al., "Heterogenization of H6PMo9V3O40 and palladium acteate in VPI-5 and MCM-41 and their use in the catalytic oxidation of benzene to phenol", Journal of Molecular Catalyst A: Chemical 134 (1998), pp. 229-235.

Kumar et al., "MCM-41, MCM-48 and related mesoporous adsorbents: their synthesis and characterization", Colloids and Surfaces A: Physicochemical and Engineering Aspects 187-188 (2001), pp. 109-116.

Martinez-Franco et al., "Hiigh-silica nanocrystalline Beta zeolites: efficient synthesis and catalytic application", Chem. Sci., 2016, 7, pp. 102-108.

Nikulshin et al. "CoMo/Al2O3 catalysts prepared on the basis of Co2Mo10-heteropolyacid and cobalt citrate: Effect of Co/Mo ratio", Fuel, vol. 100, Oct. 2012, pp. 24-33.

Kondoh et al., "Catalytic cracking of heavy oil over TiO2—ZrO2 catalysts under superheated steam conditions", Fuel, vol. 167, pp. 268-294, 2016.

Kondoh et al., "Effects of H2O Addition on Oil Sand Bitumen Cracking Using a CeO2—ZrO2—Al2O3—FeOx Catalyst", Energy Fuels, vol. 30, pp. 10358-10364, 2016.

Kondoh et al., "Upgrading of oil sand bitumen over an iron oxide catalyst using sub- and super-critical water", Fuel Processing Technology, vol. 145, pp. 96-101, 2016.

Zheng et al., "Controlling Deoxygenation Pathways in Catalytic Fast Pyrolysis of Biomass and Its Components by Using Metal-Oxide Nanocomposites", iScience 23, 100814, Jan. 24, 2020.

METHODS AND SYSTEMS FOR UPGRADING MIXED PYROLYSIS OIL TO LIGHT AROMATICS OVER MIXED METAL OXIDE CATALYSTS

BACKGROUND

Field

The present disclosure generally relates to methods and systems for upgrading hydrocarbons, more specifically, systems and methods for upgrading a mixture of heavy pyrolysis oil and light pyrolysis oil to light aromatic compounds over mixed metal oxide catalysts.

Technical Background

Crude oil can be converted to valuable chemical intermediates and products through one or more hydrotreating processes. The hydrotreating processes can include steam cracking, in which larger hydrocarbons in the crude oil are cracked to form smaller hydrocarbons. Steam cracking units produce a bottom stream, which is referred to as pyrolysis oil. The pyrolysis oil may include an increased concentration of aromatic compounds compared to the crude oil feedstock. In many crude oil processing facilities, this pyrolysis oil is burned as fuel. However, the aromatic compounds in the pyrolysis oil can be converted to greater value chemical products and intermediates, which can be used as building blocks in chemical synthesis processes. For example, aromatic compounds from the pyrolysis oil can be converted into xylenes, which can be the initial building blocks for producing terephthalic acid, which can then be used to produce polyesters. The aromatic compounds in the pyrolysis oil can be upgraded to many other greater value aromatic products and intermediates. The market demand for these greater value aromatic compounds continues to grow.

The composition of the bottom stream generated in a steam cracker depends on the composition of the feed and operational parameters of the steam cracker. As such, the pyrolysis oils generated vary from light liquids to heavy liquids based on the different steam cracker feeds. Heavy pyrolysis oils are generally generated from naphtha steam crackers and light pyrolysis oils are generally generated from gas steam crackers.

SUMMARY

Pyrolysis oils from steam cracking processes can be upgraded to produce greater value products and intermediates by contacting the pyrolysis oil with catalysts operable to convert multi-ring aromatic compounds in the pyrolysis oil to one or more light aromatic compounds, which can include benzene, toluene, ethylbenzene, xylenes, other aromatic compounds, or combinations of these. Existing catalysts operable to upgrade pyrolysis oil can include multi-metal hydrocracking catalysts that have two or more metals supported on a catalyst support. These multi-metal hydrocracking catalysts are typically prepared from conventional metal precursors, such as metallate hydrates, metal nitrates, and other conventional metal precursors impregnated onto the microporous catalyst supports.

These conventional multi-metal hydrocracking catalysts may be prepared using zeolite supports, which may generally be microporous having an average pore size of less than about 2 nanometers (nm). However, the multi-ring aromatic compounds present in pyrolysis oil may have molecular sizes that are larger than the average pore size of zeolite supports used to prepare these conventional multi-metal catalysts. Thus, the small average pore size of the nanoporous zeolites may restrict access of the larger multi-ring aromatic compounds to reactive sites within the pores of the zeolite support, thus, reducing the yield and conversion attainable with these existing multi-metal hydrocracking catalysts.

Accordingly, ongoing needs exist for improved catalysts for upgrading pyrolysis oils to produce light aromatic compounds. The present disclosure is directed to methods of upgrading mixed pyrolysis oil comprising light and heavy pyrolysis oil using mixed metal oxide catalysts. The present disclosure is also directed to systems for upgrading mixed pyrolysis oil that include mixed metal oxide catalysts. The mixed metal oxide catalysts of the present disclosure may include a plurality of catalyst particles, and each of the plurality of catalyst particles may comprise a plurality of metal oxides. The mixed metal oxide catalysts of the present disclosure may convert a portion of the multi-ring aromatic compounds in the pyrolysis oil to light aromatic compounds in a single step, without conducting a subsequent chemical reaction step. The systems and methods may also produce greater yields of light aromatic compounds from upgrading mixed pyrolysis oil compared to upgrading pyrolysis oil using existing multi-metal hydrocracking catalysts.

In accordance with one or more embodiments of the present disclosure, methods for upgrading mixed pyrolysis oil are disclosed. The methods include contacting the mixed pyrolysis oil with hydrogen in the presence of a mixed metal oxide catalyst at reaction conditions to produce a reaction effluent comprising light aromatic compounds. The mixed pyrolysis oil is formed from light pyrolysis oil and heavy pyrolysis oil at a ratio of 10:90 to 40:60 with light pyrolysis oil representing a bottom stream of a gas steam cracker and heavy pyrolysis oil representing a bottom stream of a naphtha steam cracker. The mixed pyrolysis oil comprises multi-ring aromatic compounds. The mixed metal oxide catalyst comprises a plurality of catalyst particles and each of the plurality of catalyst particles comprises a plurality of metal oxides. The mixed pyrolysis oil with hydrogen in the presence of the mixed metal oxide catalyst at the reaction conditions converts at least a portion of the multi-ring aromatic compounds in the mixed pyrolysis oil to the light aromatic compounds.

In accordance with one or more further embodiments of the present disclosure, methods for upgrading mixed pyrolysis oil are disclosed. The methods include contacting the mixed pyrolysis oil with hydrogen in the presence of a mixed metal oxide catalyst at reaction conditions to produce a reaction effluent comprising light aromatic compounds. The mixed pyrolysis oil is formed from light pyrolysis oil and heavy pyrolysis oil at a ratio of 10:90 to 40:60 with light pyrolysis oil representing a bottom stream of a gas steam cracker and heavy pyrolysis oil representing a bottom stream of a naphtha steam cracker. The mixed pyrolysis oil comprises multi-ring aromatic compounds. The mixed metal oxide catalyst comprises from 60 wt. % to 95 wt. % iron oxide, from 1 wt. % to 20 wt. % zirconium oxide, from 0.1 wt. % to 10 wt. % cerium oxide, and from 1 wt. % to 20 wt. % aluminum oxide where the weight percentages are based on the total weight of the mixed metal oxide catalyst. The mixed pyrolysis oil with hydrogen in the presence of the mixed metal oxide catalyst at the reaction conditions converts at least a portion of the multi-ring aromatic compounds in the mixed pyrolysis oil to the light aromatic compounds.

In accordance with one or more further embodiments of the present disclosure, systems for upgrading mixed pyrolysis oil are disclosed. The systems include a mixed pyrolysis oil stream, a pyrolysis oil upgrading unit in fluid communication with the mixed pyrolysis oil stream, and a separation unit disposed downstream of the pyrolysis oil upgrading unit. The pyrolysis oil upgrading unit comprises a mixed metal oxide catalyst. The mixed pyrolysis oil stream is formed from light pyrolysis oil and heavy pyrolysis oil at a ratio of 10:90 to 40:60 with light pyrolysis oil representing a bottom stream of a gas steam cracker and heavy pyrolysis oil representing a bottom stream of a naphtha steam cracker. The mixed metal oxide catalyst comprises a plurality of catalyst particles and each of the plurality of catalyst particles comprises a plurality of metal oxides. The pyrolysis oil upgrading unit is operable to contact the mixed pyrolysis oil stream with hydrogen in the presence of the mixed metal oxide catalyst to produce a reaction effluent. The separation unit is operable to separate a used mixed metal oxide catalyst from the reaction effluent to produce a reaction product comprising light aromatic compounds.

In accordance with yet one or more further embodiments of the present disclosure, systems for upgrading mixed pyrolysis oil are disclosed. The systems include a mixed pyrolysis oil stream, a pyrolysis oil upgrading unit in fluid communication with the mixed pyrolysis oil stream, and a separation unit disposed downstream of the pyrolysis oil upgrading unit. The pyrolysis oil upgrading unit comprises a mixed metal oxide catalyst. The mixed pyrolysis oil stream is formed from light pyrolysis oil and heavy pyrolysis oil at a ratio of 10:90 to 40:60 with light pyrolysis oil representing a bottom stream of a gas steam cracker and heavy pyrolysis oil representing a bottom stream of a naphtha steam cracker. The mixed metal oxide catalyst comprises from 60 wt. % to 95 wt. % iron oxide; from 1 wt. % to 20 wt. % zirconium oxide; from 0.1 wt. % to 10 wt. % cerium oxide; and from 1 wt. % to 20 wt. % aluminum oxide, where the weight percentages are based on the total weight of the mixed metal oxide catalyst. The pyrolysis oil upgrading unit is operable to contact the mixed pyrolysis oil stream with hydrogen in the presence of the mixed metal oxide catalyst to produce a reaction effluent. The separation unit is operable to separate a used mixed metal oxide catalyst from the reaction effluent to produce a reaction product comprising light aromatic compounds.

Additional features and advantages of the technology described in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Figure 1:
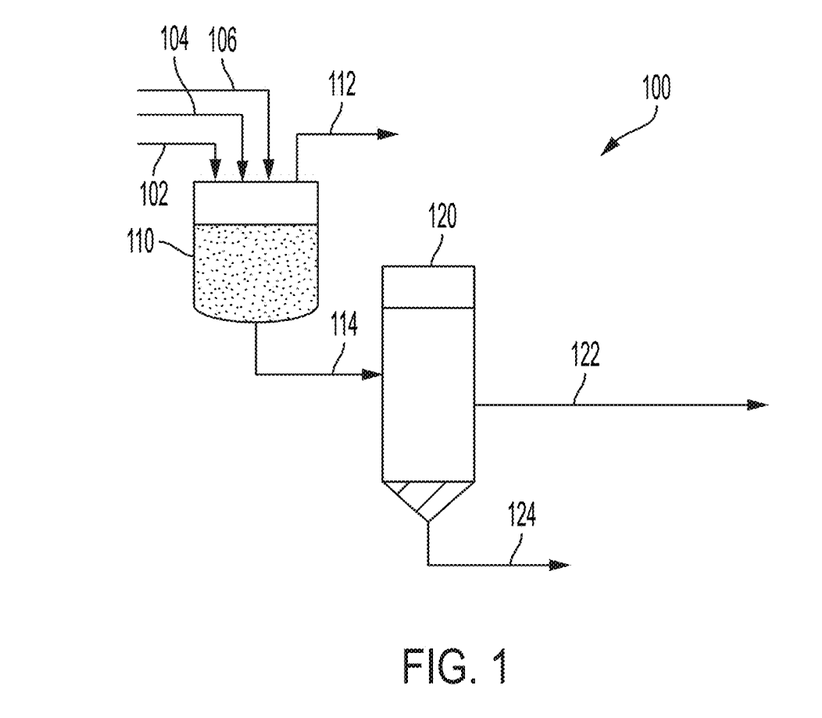
FIG. 1 schematically depicts a generalized flow diagram of a system for upgrading a mixture of light pyrolysis oil and heavy pyrolysis oil, according to one or more embodiments shown and described in this disclosure.
Figure 2:
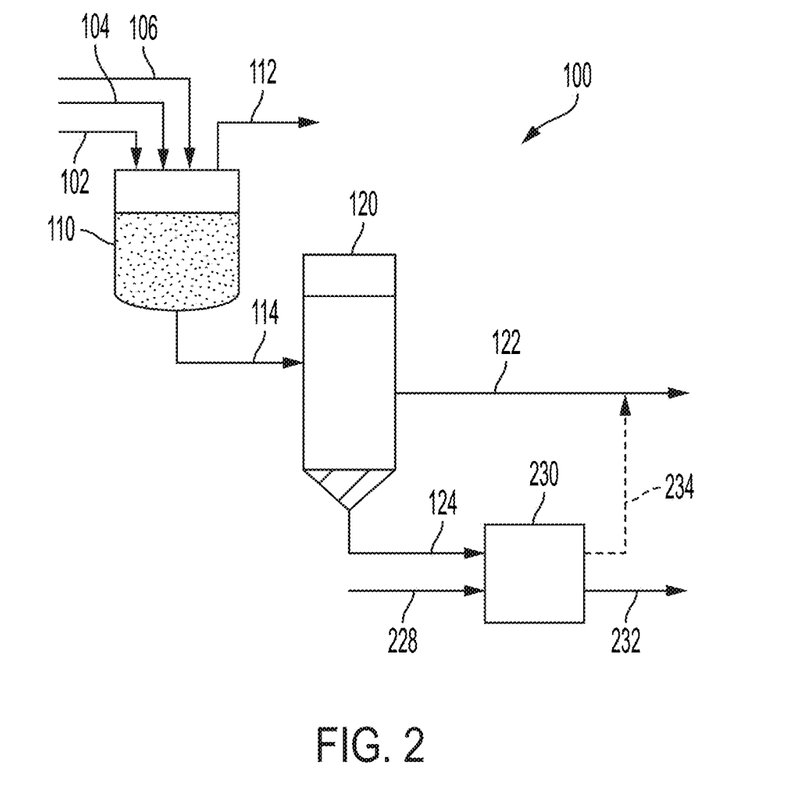
FIG. 2 schematically depicts a generalized flow diagram of another system for upgrading a pyrolysis oil, including washing a used mixed metal oxide catalyst, according to one or more embodiments shown and described in this disclosure.

For the purpose of describing the simplified schematic illustrations and descriptions of FIGS. 1 and 2, the numerous valves, temperature sensors, electronic controllers, and the like that may be employed and well known to those of ordinary skill in the art of certain chemical processing operations are not included. Further, accompanying components that are often included in chemical processing operations, such as, for example, air supplies, heat exchangers, surge tanks, catalyst hoppers, or other related systems are not depicted. It would be known that these components are within the spirit and scope of the present embodiments disclosed. However, operational components, such as those described in the present disclosure, may be added to the embodiments described in this disclosure.

It should further be noted that arrows in the drawings refer to process streams. However, the arrows may equivalently refer to transfer lines that may serve to transfer process streams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows that do not connect two or more system components signify a product stream which exits the depicted system or a system inlet stream which enters the depicted system. Product streams may be further processed in accompanying chemical processing systems or may be commercialized as end products. System inlet streams may be streams transferred from accompanying chemical processing systems or may be non-processed feedstock streams. Some arrows may represent recycle streams, which are effluent streams of system components that are recycled back into the system. However, it should be understood that any represented recycle stream, in some embodiments, may be replaced by a system inlet stream of the same material, and that a portion of a recycle stream may exit the system as a system product.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component.

It should be understood that two or more process streams are "mixed" or "combined" when two or more lines intersect in the schematic flow diagrams of FIGS. 1 and 2. Mixing or combining may also include mixing by directly introducing both streams into a like reactor, separation device, or other system component. For example, it should be understood that when two streams are depicted as being combined directly prior to entering a separation unit or reactor, that in some embodiments the streams could equivalently be introduced into the separation unit or reactor and be mixed in the reactor.

Reference will now be made in greater detail to various embodiments of the present disclosure, some embodiments of which are illustrated in the accompanying drawings. Whenever possible, the same reference numerals will be used throughout the drawings to refer to the same or similar parts.

DETAILED DESCRIPTION

Embodiments of the present disclosure are directed to methods and systems for upgrading mixed pyrolysis oil. Referring now to FIG. 1, one embodiment of a system 100 of the present disclosure for upgrading mixed pyrolysis oil 102 is schematically depicted. The systems 100 for upgrading mixed pyrolysis oil 102 may comprise a pyrolysis upgrading unit 110 and a separation unit 120 disposed downstream of the pyrolysis upgrading unit 110. The pyrolysis upgrading unit 110 may include a mixed metal oxide catalyst 106 comprising a plurality of catalyst particles and each of the plurality of catalyst particles comprises a plurality of metal oxides. The pyrolysis upgrading unit 110 may be operable to contact the mixed pyrolysis oil 102 with hydrogen 104 in the presence of the mixed metal oxide catalyst 106 to produce a reaction effluent 114. The separation unit 120 disposed downstream of the pyrolysis upgrading unit 110 may be operable to separate used mixed metal oxide catalyst 124 from the reaction effluent 114 to produce a reaction product effluent 122 comprising light aromatic compounds.

The present disclosure is also directed to methods for upgrading mixed pyrolysis oil 102. In particular, the methods may comprise contacting the mixed pyrolysis oil 102 with hydrogen 104 in the presence of a mixed metal oxide catalyst 106 at reaction conditions to produce a reaction effluent 114 comprising light aromatic compounds.

The various methods and systems of the present disclosure for upgrading mixed pyrolysis oil may convert the mixed pyrolysis oil to light aromatics in a single step. Traditionally, pyrolysis oil has not been able to be upgraded to light aromatics in a single step over conventional catalysts, such as conventional multi-metal hydrocracking catalysts. In the systems and methods of the present disclosure, the mixed pyrolysis oil may be contacted with hydrogen in the presence of the mixed metal oxide catalyst to covert multi-ring aromatic compounds in the mixed pyrolysis oil to light aromatics in a single step.

As used in this disclosure, a "mixed pyrolysis oil" refers to a pyrolysis oil formed from a mixture of light pyrolysis oil and heavy pyrolysis oil. Light pyrolysis oil represents a bottom stream from a gas steam cracker and heavy pyrolysis oil represents a bottom stream from a naphtha steam cracker.

As used in this disclosure, a "catalyst" may refer to any substance that increases the rate of a specific chemical reaction. Catalysts and catalyst components described in this disclosure may be utilized to promote various reactions, such as, but not limited to hydrogenation, ring opening, disproportionation, dealkylation, transalkylation, cracking, aromatic cracking, or combinations of these.

As used in this disclosure, "cracking" may refer to a chemical reaction where a molecule having carbon-carbon bonds is broken into more than one molecule by the breaking of one or more of the carbon-carbon bonds; where a compound including a cyclic moiety, such as an aromatic, is converted to a compound that does not include a cyclic moiety; or where a molecule having carbon-carbon double bonds are reduced to carbon-carbon single bonds. Some catalysts may have multiple forms of catalytic activity, and calling a catalyst by one particular function does not render that catalyst incapable of being catalytically active for other functionality.

As used in this disclosure, the term "aromatic compounds" may refer to one or more compounds having one or more aromatic ring structures. The term "light aromatic compounds" may refer to one or more compounds having an aromatic ring, with or without substitution, and from six to eight carbon atoms. The term "BTEX" may refer to any combination of benzene, toluene, ethylbenzene, para-xylene, meta-xylene, and ortho-xylene.

As used throughout the present disclosure, the term "crude oil" or "whole crude oil" may refer to crude oil received directly from an oil field or from a desalting unit without having any fraction separated by distillation.

As used throughout the present disclosure, the terms "upstream" and "downstream" may refer to the relative positioning of unit operations with respect to the direction of flow of the process streams. A first unit operation of a system may be considered "upstream" of a second unit operation if process streams flowing through the system encounter the first unit operation before encountering the second unit operation. Likewise, a second unit operation may be considered "downstream" of the first unit operation if the process streams flowing through the system encounter the first unit operation before encountering the second unit operation.

As used in the present disclosure, passing a stream or effluent from one unit "directly" to another unit may refer to passing the stream or effluent from the first unit to the second unit without passing the stream or effluent through an intervening reaction system or separation system that substantially changes the composition of the stream or effluent. Heat transfer devices, such as heat exchangers, preheaters, coolers, condensers, or other heat transfer equipment, and pressure devices, such as pumps, pressure regulators, compressors, or other pressure devices, are not considered to be intervening systems that change the composition of a stream or effluent. Combining two streams or effluents together upstream of a process unit also is not considered to comprise an intervening system that changes the composition of one or both of the streams or effluents being combined. Simply dividing a stream into two streams having the same composition is also not considered to comprise an intervening system that changes the composition of the stream.

As used in this disclosure, a "separation unit" refers to any separation device that at least partially separates one or more chemicals that are mixed in a process stream from one another. For example, a separation unit may selectively separate differing chemical species from one another, forming one or more chemical fractions. Examples of separation units include, without limitation, distillation columns, flash drums, knock-out drums, knock-out pots, centrifuges, filtration devices, traps, scrubbers, expansion devices, membranes, solvent extraction devices, and the like. It should be understood that separation processes described in this disclosure may not completely separate all of one chemical consistent from all of another chemical constituent. It should be understood that the separation processes described in this disclosure "at least partially" separate different chemical components from one another, and that even if not explicitly stated, it should be understood that separation may include only partial separation. As used in this disclosure, one or more chemical constituents may be "separated" from a process stream to form a new process stream. Generally, a process stream may enter a separation unit and be divided or separated into two or more process streams of desired composition. Further, in some separation processes, a "light fraction" and a "heavy fraction" may separately exit the separation unit. In general, the light fraction stream has a lesser boiling point than the heavy fraction stream. It should be additionally understood that where only one separation unit is depicted in a figure or described, two or more separation units may be employed to carry out the identical or substantially identical separation. For example, where a distillation column with multiple outlets is described, it is contemplated that several separators arranged in series may equally separate the feed stream and such embodiments are within the scope of the presently described embodiments.

As used in this disclosure, the term "effluent" may refer to a stream that is passed out of a reactor, a reaction zone, or a separation unit following a particular reaction or separation process. Generally, an effluent has a different composition than the stream that entered the separation unit, reactor, or reaction zone. It should be understood that when an effluent is passed to another system unit, only a portion of that system stream may be passed. For example, a slip stream (having the same composition) may carry some of the effluent away, meaning that only a portion of the effluent may enter the downstream system unit. The term "reaction effluent" may more particularly be used to refer to a stream that is passed out of a reactor or reaction zone.

It should further be understood that streams may be named for the components of the stream, and the component for which the stream is named may be the major component of the stream (such as comprising from 50 weight percent (wt. %), from 70 wt. %, from 90 wt. %, from 95 wt. %, from 99 wt. %, from 99.5 wt. %, or even from 99.9 wt. % of the contents of the stream to 100 wt. % of the contents of the stream). It should also be understood that components of a stream are disclosed as passing from one system component to another when a stream comprising that component is disclosed as passing from that system component to another. For example, a disclosed "hydrogen stream" passing to a first system component or from a first system component to a second system component should be understood to equivalently disclose "hydrogen" passing to the first system component or passing from a first system component to a second system component.

Referring again to FIG. 1, a system 100 for upgrading mixed pyrolysis oil 102 is schematically depicted. The system 100 for upgrading mixed pyrolysis oil 102 may include a pyrolysis upgrading unit 110 and a separation unit 120 downstream of the pyrolysis upgrading unit 110. The pyrolysis upgrading unit 110 may include one or a plurality of reactors and may be operable to contact the mixed pyrolysis oil 102 with hydrogen 104 in the presence of the mixed metal oxide catalyst 106 to produce a reaction effluent 114. The reaction effluent 114 may be passed to the separation unit 120, which may include one or a plurality of separation processes or unit operations. The separation unit 120 may be operable to separate used mixed metal oxide catalyst from the reaction effluent 114 to produce a reaction product effluent 122 and used mixed metal oxide catalyst 124. The reaction product effluent 122 may comprise light aromatic compounds. In particular, the reaction product effluent 122 may comprise benzene, toluene, ethylbenzene, xylenes, or combinations of these.

The mixed pyrolysis oil 102 is a mixture of light pyrolysis oil and heavy pyrolysis oil streams from a hydrocarbon processing facility. The mixed pyrolysis oil 102 is rich in aromatic compounds, such as multi-ring aromatic compounds. In embodiments, the mixed pyrolysis oil 102 may be formed from light pyrolysis oil generated as a bottom stream from a gas steam cracking process and heavy pyrolysis oil generated as a bottom stream from a naphtha steam cracking process. As used in the present disclosure, "bottom stream" may refer to a residuum or an effluent stream including the least volatile constituents that have not been separately captured as condensed vapor. In various embodiments, the mixed pyrolysis oil 102 is formed from the light pyrolysis oil and the heavy pyrolysis oil at a ratio of 10:90 to 40:60, 10:90 to 35:65, 10:90 to 30:70, 15:85 to 75:25, 18:82 to 22:78, or approximately 1:4.

The mixed pyrolysis oil 102 may include mono-aromatic compounds and multi-ring aromatic compounds. Multi-ring aromatic compounds may include aromatic compounds including 2, 3, 4, 5, 6, 7, 8, or more than 8 aromatic ring structures. The mixed pyrolysis oil 102 may also include other components, such as but not limited to saturated hydrocarbons. In accordance with the present disclosure, light pyrolysis oil is mainly mono-aromatics with a boiling range from 78° C. to 360° C. and heavy pyrolysis oil is poly-aromatics with more than one benzene ring with a boiling range from 165° C. to 720° C. Referring to Table 1, the composition of a typical heavy pyrolysis oil produced from naphtha steam cracking is provided as tested using 2D Gas Chromatography. Referring to Table 2, the composition of a typical light pyrolysis oil produced from gas steam cracking is provided.

TABLE 1

Example Heavy Pyrolysis Oil Composition

| Component | Weight Percent |
|---|---|
| Saturated Hydrocarbon | 2 |
| Mono-aromatics | 18 |
| Di-aromatics | 28 |
| Tri-aromatics | 5 |
| Tetra-aromatics | 5 |
| Penta-aromatics | 9 |
| Hexa-aromatics | 10 |
| Hepta and greater aromatics | 23 |

TABLE 2

Example Light Pyrolysis Oil Composition

| Component | Weight Percent |
|---|---|
| Paraffins | 8 |
| BTEX | 4 |
| Other mono-aromatics | 59 |
| Naphthalenes | 3 |
| Naphtheno/Olefino-Benzenes | 1 |
| Indenes | 11 |
| Mono-Naphthenes | 4 |
| Dicyclopentadiene (DCPD) | 9 |
| Olefins | 1 |

As shown in Table 1, the heavy pyrolysis oil may include mono-aromatics, di-aromatics, tri-aromatics, tetra-aromatics, penta-aromatics, hexa-aromatics, and aromatic compounds having 7 or more aromatic rings denoted as Hepta and greater aromatics in Table 1. The heavy pyrolysis oil may include elevated concentrations of di-aromatic compounds and aromatic compounds having greater than or equal to 7 aromatic rings, as indicated by Table 1. In embodiments, the heavy pyrolysis oil may include greater than or equal to 50 wt. % multi-ring aromatic compounds, such as greater than or equal to 60 wt. %, greater than or equal to 65 wt. %, greater than or equal to 70 wt. %, greater than or equal to 75 wt. %, or even greater than or equal to 80 wt. % multi-ring aromatic compounds based on a unit weight of the heavy pyrolysis oil. The heavy pyrolysis oil may include greater than or equal to 30 wt. % multi-ring aromatic compounds having greater than or equal to sixteen carbon atoms, such as greater than or equal to 35 wt. %, greater than or equal to 40 wt. %, greater than or equal to 45 wt. %, greater than or equal to 50 wt. %, or even greater than or equal to 55 wt. % multi-ring aromatic compounds having greater than or equal to sixteen carbon atoms, based on the unit weight of the heavy pyrolysis oil. The heavy pyrolysis oil may also have a low concentration of sulfur and sulfur compounds. The heavy pyrolysis oil may have a concentration of sulfur and sulfur-containing compounds of less than or equal to 500 parts per million by weight (ppmw), such as less than or equal to 400 ppmw, or even less than or equal to 300 ppmw.

As shown in Table 2, the light pyrolysis oil may include elevated concentrations of mono-aromatics. It will be appreciated that mono-aromatics are a desirable compositions in pyrolysis oil, because they are more easily converted to BTEX than the remainder of components of the pyrolysis oil. In embodiments, the light pyrolysis oil may include greater than or equal to 30 wt. % mono-ring aromatic compounds, such as greater than or equal to 35 wt. %, greater than or equal to 40 wt. %, greater than or equal to 45 wt. %, greater than or equal to 50 wt. %, or even greater than or equal to 55 wt. % mono-ring aromatic compounds, based on the unit weight of the light pyrolysis oil. The light pyrolysis oil may also have a low concentration of sulfur and sulfur compounds. The light pyrolysis oil may have a concentration of sulfur and sulfur-containing compounds of less than or equal to 500 ppmw, such as less than or equal to 400 ppmw, or even less than or equal to 300 ppmw.

The mixed pyrolysis oil 102 may include greater than or equal to 30 wt. % multi-ring aromatic compounds having greater than or equal to sixteen carbon atoms, such as greater than or equal to 35 wt. %, greater than or equal to 40 wt. %, greater than or equal to 45 wt. %, greater than or equal to 50 wt. %, or even greater than or equal to 55 wt. % multi-ring aromatic compounds having greater than or equal to sixteen carbon atoms, based on the unit weight of the mixed pyrolysis oil 102. The mixed pyrolysis oil 102 may also have a low concentration of sulfur and sulfur compounds. The mixed pyrolysis oil 102 may have a concentration of sulfur and sulfur-containing compounds of less than or equal to 500 parts ppmw, such as less than or equal to 400 ppmw, or even less than or equal to 300 ppmw.

The mixed pyrolysis oil 102 is essentially formed by diluting heavy pyrolysis oil with light pyrolysis oil prior to passing the resulting mixed pyrolysis oil 102 to the pyrolysis upgrading unit 110. Due to the high viscosity of the heavy pyrolysis oil, light pyrolysis oil may be added as a diluent to increase the fluidity of the heavy pyrolysis oil through generation of the mixed pyrolysis oil 102. The addition of the light pyrolysis oil to the heavy pyrolysis oil may allow the heavy pyrolysis oil to have increased contact with the surfaces of the mixed metal oxide catalyst 106. Further, inclusion of light pyrolysis oil as the diluent for the heavy pyrolysis oil is beneficial as the light pyrolysis oil may additional function as a co-feed which may also be upgraded to light aromatic products such as benzene, toluene, ethylbenzene, xylene, or combinations of the same Referring again to FIG. 1, the mixed pyrolysis oil 102 may be passed to the pyrolysis upgrading unit 110. The pyrolysis upgrading unit 110 may be operable to contact the mixed pyrolysis oil 102 with hydrogen 104 in the presence of the mixed metal oxide catalyst 106 to produce a reaction effluent 114. Contacting the mixed pyrolysis oil 102 with hydrogen 104 in the presence of the mixed metal oxide catalyst 106 may convert multi-ring aromatic compounds having greater than or equal to sixteen carbon atoms in the mixed pyrolysis oil 102 to light aromatic compounds. The hydrogen 104 may include a recycled hydrogen stream or supplemental hydrogen from an external hydrogen source inside or outside the battery limits of the refinery. The hydrogen 104 may be passed directly to the pyrolysis upgrading unit 110 or may be combined with the mixed pyrolysis oil 102 upstream of the pyrolysis upgrading unit 110. The hydrogen 104 may be used to pressurize the pyrolysis upgrading unit 110 to the operating pressure.

The pyrolysis upgrading unit 110 may include any type of reactor suitable for contacting the mixed pyrolysis oil 102 with hydrogen 104 in the presence of the mixed metal oxide catalyst 106. Suitable reactors may include, but are not limited to, batch reactors, fixed bed reactors, moving bed reactors, continuous stirred tank reactors, plug flow reactors, thick liquid attitude bed reactors, boiling-bed reactors, or combinations of reactors. In embodiments, the pyrolysis upgrading unit 110 comprises one or a plurality of batch reactors.

The mixed metal oxide catalyst 106 may be operable to convert multi-ring aromatic compounds having greater than or equal to sixteen carbon atoms in the mixed pyrolysis oil 102 to light aromatic compounds. The mixed metal oxide catalyst 106 may include a plurality of catalyst particles. Each of the plurality of catalyst particles may include a plurality of metal oxides. The plurality of metal oxides of the mixed metal oxide catalyst 106 may include oxides of metals in groups 3-13 of the International Union of Pure and Applied Chemistry (IUPAC) periodic table. In embodiments, the plurality of metal oxides of the mixed metal oxide catalyst 106 may include oxides of iron, zirconium, cerium, aluminum, tungsten, molybdenum, titanium, or combinations of these. The mixed metal oxide catalyst 106 may also include oxides of metalloids, such as oxides of silicon. The mixed metal oxide catalyst 106 may comprise oxides of metals or metalloids selected from the group consisting of iron oxide ($Fe_2O_3$), zirconium oxide ($ZrO_2$), cerium oxide ($CeO_2$), aluminum oxide (alumina) ($Al_2O_3$), silica ($SiO_2$), tungsten oxide ($WO_3$), molybdenum oxide ($MoO_3$), titanium oxide ($TiO_2$), and combinations of these.

The mixed metal oxide catalyst 106 may include iron oxide as one of the plurality of metal oxides. In embodiments, the mixed metal oxide catalyst 106 may include from 60 wt. % to 95 wt. % iron oxide, such as from 70 wt. % to 90 wt. %, from 75 wt. % to 85 wt. %, or from 80 wt. % to 85 wt. % iron oxide. The mixed metal oxide catalyst 106 may include zirconium oxide as one of the plurality of metal oxides. In embodiments, the mixed metal oxide catalyst 106 may include from 1 wt. % to 20 wt. % zirconium oxide, such as from 1 wt. % to 15 wt. %, from 2.5 wt. % to 12.5 wt. %, or from 5 wt. % to 10 wt. % zirconium oxide. The mixed metal oxide catalyst 106 may include cerium oxide as one of the plurality of metal oxides. In embodiments, the mixed metal oxide catalyst 106 may include from 0.1 wt. % to 10 wt. % cerium oxide, such as from 0.5 wt. % to 7.5 wt. %, from 0.5 wt. % to 5 wt. %, or from 1 wt. % to 5 wt. %. The mixed metal oxide catalyst 106 may include aluminum oxide (alumina) as one of the plurality of metal oxides. In embodiments, the mixed metal oxide catalyst 106 may include from 1 wt. % to 20 wt. % aluminum oxide (alumina), such as from 2.5 wt. % to 15 wt. %, from 3 wt. % to 12.5 wt. %, or from 5 wt. % to 10 wt. %. The weight percentages of the plurality of metal oxides of the mixed metal oxide catalyst 106 are based on the total weight of the mixed metal oxide catalyst 106. The mixed metal oxide catalyst 106 may comprise, consist of, or consist essentially of from 60 wt. % to 95 wt. % iron oxide, from 1 wt. % to 20 wt. % zirconium oxide, from 0.1 wt. % to 10 wt. % cerium oxide, and from 1 wt. % to 20 wt. % aluminum oxide (alumina). In embodiments, the mixed metal oxide catalyst 106 may include 83 wt. % iron oxide, 7.5 wt. % zirconium oxide, 2.5 wt. % cerium oxide, and 7.0 wt. % aluminum oxide (alumina).

Contacting the mixed pyrolysis oil 102 with hydrogen 104 in the presence of the mixed metal oxide catalyst 106 at the reaction conditions may convert at least a portion of the multi-ring aromatic compounds in the mixed pyrolysis oil 102 to the light aromatic compounds in a single step, without conducting a subsequent chemical reaction step. Converting di-aromatic and multi-ring aromatic compounds to light aromatic compounds, such as benzene, toluene, ethylbenzene, and xylenes, is a complicated reaction scheme comprising multiple synchronized and selective reactions, which may include selective hydrogenation of one aromatic ring in a compound but not all, subsequent ring opening of the saturated naphthenic ring, hydro-dealkylation, trans-alkylation, and disproportionation reactions. Not intending to be bound by any particular theory, it is believed that upgrading the mixed pyrolysis oil 102 may include selective hydrogenation of at least one aromatic ring structure or a multi-ring aromatic compound to produce a molecule with one or more aromatic rings and at least one saturated ring. The saturated ring portion may then undergo ring opening to produce a substituted aromatic compound. The substituted aromatic may then undergo one or more of hydro-dealkylation, trans-alkylation, or disproportionation to produce light aromatic compounds. It is understood that multiple variations and combinations of these reactions as well as other chemical reactions may occur during the upgrading process. This complex sequence of synchronized reactions for upgrading the mixed pyrolysis oil 102 may be catalyzed using the mixed metal oxide catalyst 106.

The pyrolysis upgrading unit 110 may contact the mixed pyrolysis oil 102 with hydrogen 104 in the presence of the mixed metal oxide catalyst 106 at operating conditions sufficient to cause at least a portion of multi-ring aromatic compounds in the mixed pyrolysis oil 102 to be upgraded to produce a reaction effluent 114, where the reaction effluent 114 comprises light aromatic compounds. The pyrolysis upgrading unit 110 may be operated at an operating temperature in the range of from 300 degrees Celsius (° C.) to 500° C., such as from 350° C. to 500° C., from 400° C. to 500° C., from 450° C. to 500° C., from 350° C. to 450° C., or from 400° C. to 450° C., and an operating pressure of from 1 megapascal (MPa) (10 bar) to 20 MPa (200 bar), such as from 3 MPa (30 bar) to 18 MPa (180 bar) or from 5 MPa (50 bar) to 16 MPa (160 bar). The weight ratio of mixed metal oxide catalyst 106 to pyrolysis oil 102 in the reactor may range from 0.1 to 1, such as from 0.1 to 0.6, from 0.1 to 0.3, from 0.2 to 1, from 0.2 to 0.6, or from 0.2 to 0.3.

Contacting the mixed pyrolysis oil 102 with hydrogen 104 in the presence of the mixed metal oxide catalyst 106 at the operating conditions of the pyrolysis upgrading unit 110 may cause at least a portion of multi-ring aromatic compounds in the mixed pyrolysis oil 102 to undergo multiple synchronized and selective reactions to form light aromatic compounds. Contacting the mixed pyrolysis oil 102 with hydrogen 104 in the presence of the mixed metal oxide catalyst 106 may result in a yield of greater than or equal to 30 wt. % light aromatic compounds, such as greater than or equal to 35 wt. %, greater than or equal to 40 wt. %, greater than or equal to 45 wt. %, or greater than or equal to 50 wt. % light aromatic compounds, based on the total weight of the reaction effluent 114.

The pyrolysis upgrading unit 110 may include one or more vapor outlets operable to pass gaseous constituents out of the pyrolysis upgrading unit 110 as a gaseous constituent effluent 112. The one or more vapor outlets may be operable to separate the gaseous constituent effluent 112 from the reaction effluent 114 after contacting the mixed pyrolysis oil 102 with hydrogen 104 in the presence of the mixed metal oxide 106. The gaseous constituents of the gaseous constituent effluent 112 may include, but are not limited to, excess hydrogen 104, light hydrocarbons (e.g., methane, ethane, etc.), sulfur components (e.g., hydrogen sulfide ($H_2S$)), or combinations of these. The gaseous constituent effluent 112 may include at least 90%, at least 95%, at least 98%, at least 99%, or even at least 99.9% by weight of the gaseous constituents produced in the pyrolysis upgrading unit 110 after upgrading the mixed pyrolysis oil 102, where the gaseous constituents generally refers to compounds that are gases at the reaction conditions in the pyrolysis upgrading unit 110. The gaseous constituent effluent 112 may also include excess hydrogen 104. The gaseous constituent effluent 112 may be passed to one or more downstream treatment processes, such as but not limited to processes for recovering any light aromatic compounds from the gaseous constituent effluent 112, separation of excess hydrogen, removal of one or more contaminants, or other processes.

The pyrolysis upgrading unit 110 may be in fluid communication with the separation unit 120 to pass the reaction effluent 114 from the pyrolysis upgrading unit 110 to the separation unit 120. The reaction effluent 114 may comprise light aromatic compounds. The light aromatic compounds may include aromatic hydrocarbons having six to thirteen carbon atoms. For example, the light aromatic compounds may include benzene, toluene, ethylbenzene, xylene, or combinations of these. The reaction effluent 114 may include at least 90%, at least 95%, at least 98%, at least 99%, or even at least 99.9% by weight of the light aromatic compounds produced in the pyrolysis upgrading unit 110. The reaction effluent 114 may also include the mixed metal oxide catalyst 106 and any unreacted constituents of the mixed pyrolysis oil 102, such as unreacted heavy aromatic compounds.

Referring again to FIG. 1, the reaction effluent 114 may be passed to the separation unit 120. The separation unit 120 may be directly downstream of the pyrolysis upgrading unit 110 so that the reaction effluent 114 can be passed directly from the pyrolysis upgrading unit 110 to the separation unit 120 without passing through any intervening reactors or unit operations. The separation unit 120 may include one or a plurality of separation units. The separation unit 120 may be operable to separate the reaction effluent 114 into at least the reaction product effluent 122 and used mixed metal oxide catalyst 124. The separation unit 120 may include a solid-liquid separation device operable to separate the reaction effluent 114 into at least one reaction product effluent 122 and the used mixed metal oxide catalyst 124. In embodiments, the separation unit 120 may include a centrifuge. The separation unit 120 may be operable to separate the reaction effluent 114 by centrifugation into at least the reaction product effluent 122 and the used mixed metal oxide catalyst 124.

Although the separation unit 120 is depicted in FIG. 1 as separating the reaction effluent 114 into a reaction product effluent 122 comprising light aromatic compounds and the used mixed metal oxide catalyst 124, it is understood that the separation unit 120 may be operable to separate the reaction effluent 114 into a plurality of reaction product effluents, one or more of which may include light aromatic compounds. In embodiments, the separation unit 120 may include a distillation unit or fractionation unit downstream of the solid-liquid separation unit. The distillation unit or fractionation unit may be operable to separate the reaction product effluent 122 into a plurality for reaction product effluents. The reaction product effluent 122 may be passed to one or more downstream processes for further separation, treatment, or processing.

Referring now to FIG. 2, the system 100 may include a used catalyst treatment unit 230 downstream from the separation unit 120. Contacting the mixed pyrolysis oil 102 with hydrogen 104 in the presence of the mixed metal oxide catalyst 106 at the reaction conditions may produce a condensate that may be deposited on the mixed metal oxide catalyst 106. Used mixed metal oxide catalyst 124 may be produced when the condensate is deposited on the mixed metal oxide catalyst 106. The used catalyst treatment unit 230 may be operable to regenerate used mixed metal oxide catalyst 124. The used catalyst treatment unit 230 may be operable to wash the used mixed metal oxide catalyst 124 with toluene 228 to remove at least a portion of the condensate from the used mixed metal oxide catalyst 124. Excess toluene 234 from the used catalyst treatment unit 230 may be passed out of the used catalyst treatment unit 230 and combined with the reaction product effluent 122.

The used catalyst treatment unit 230 may also be operable to vacuum dry the used mixed metal oxide catalyst 124 after washing. The used catalyst treatment unit 230 may be operable to vacuum dry the used mixed metal oxide catalyst 124 first at a temperature of from 20° C. to 30° C. and second at a temperature greater than 80° C. The used catalyst treatment unit 230 may also be operable to calcine the used mixed metal oxide catalyst 124 to produce a treated mixed metal oxide catalyst 232. In embodiments, the used catalyst treatment unit 230 may calcine the used mixed metal oxide catalyst 124 in air at a temperature of greater than 400° C. for six or more hours. The treated mixed metal oxide catalyst 232 may be passed out of the used catalyst treatment unit 230 and used back in the pyrolysis upgrading unit 110 as the mixed metal oxide catalyst 106.

Referring again to FIG. 1, a method for upgrading mixed pyrolysis oil 102 may include contacting the mixed pyrolysis oil 102 with hydrogen 104 in the presence of a mixed metal oxide catalyst 106 at reaction conditions to produce a reaction effluent 114 comprising light aromatic compounds. As previously described in the present disclosure, contacting the mixed pyrolysis oil 102 with hydrogen 104 in the presence of the mixed metal oxide catalyst 106 at the reaction conditions may convert at least a portion of the multi-ring aromatic compounds in the mixed pyrolysis oil 102 to light aromatic compounds. The reaction conditions may include a temperature of from 200° C. to 500° C., a pressure of from 1 MPa (10 bar) to 20 MPa (200 bar), weight ratio of mixed metal oxide catalyst 106 to pyrolysis oil 102 in the reactor may range from 0.1 to 1, or combinations of these reaction conditions.

The method may include contacting the mixed pyrolysis oil 102 with hydrogen 104 in the presence of the mixed metal oxide catalyst 106 in a pyrolysis upgrading unit 110 to produce the reaction effluent 114. The pyrolysis upgrading unit 110 may have any of the features, catalysts, or operating conditions previously discussed in this disclosure for the pyrolysis upgrading unit 110. The method may also include separating the reaction effluent 114 in the separation unit 120 to produce the at least one reaction product effluent 122 and the used mixed metal oxide catalyst 124. The separation unit 120 may have any of the features, catalysts, or operating conditions previously discussed in this disclosure for the separation unit 120.

The method may include washing and drying the used mixed metal oxide catalyst 124. The used mixed metal oxide catalyst 124 may be washed with toluene 228 to remove at least a portion of the condensate from the used mixed metal oxide catalyst 124. It is contemplated that the used mixed metal oxide catalyst 124 may additionally or alternatively be washed with other solvents, such as, but not limited to, benzene, ethylbenzene, or xylenes to remove at least a portion of the condensate from the used mixed metal oxide catalyst 124. Washing and drying the used mixed metal oxide catalyst 124 may occur in the used catalyst treatment unit 230. The used catalyst treatment unit 230 may have any of the features, catalysts, or operating conditions previously discussed in this disclosure for the used catalyst treatment unit 230.

EXAMPLES

The various embodiments of methods and systems for the processing of mixed pyrolysis oils will be further clarified by the following examples. The examples are illustrative in nature, and should not be understood to limit the subject matter of the present disclosure.

Example 1: Mixed Metal Oxide Catalyst Preparation

To prepare a mixed metal oxide catalyst comprising iron oxide, zirconium oxide, cerium oxide, and aluminum oxide, 40 grams of iron(III) nitrate nonahydrate ($Fe(NO_3)_3 \cdot 9H_2O$) was dissolved in 800 mL of distilled water to make Solution A. Then, the other metal oxide precursors were added into Solution A. Specifically, 4.906 grams of aluminum nitrate nonahydrate ($Al(NO_3)_3 \cdot 9H_2O$), 1.549 grams of zirconium (IV) oxynitrate hydrate ($ZrO(NO_3)_2 : 3\ H_2O$), and 0.601 grams of cerium(III) nitrate hexahydrate ($Ce(NO_3)_3 \cdot 6H_2O$) were added into Solution A to form Solution B. Solution B was then stirred for thirty minutes.

An ammonia solution, Solution C, was prepared by adding 40 mL ammonium hydroxide ($NH_4OH$) (28-30% $NH_3$ basis) in 60 mL distilled water. Solution C was added slowly into Solution B to produce Solution D. Solution C was added until the pH value of Solution D reached approximately 7. Solution D was then stirred for an additional hour.

After preparation of Solution D and the additional hour of stirring, a precipitate was separated from Solution D and dried in an oven overnight or approximately twelve hours. The dried precipitate was then calcined in air at 500° C. for two hours. After calcining, the dried and calcined precipitate was crushed to obtain the final mixed metal oxide catalyst.

Example 2: Upgrading Mixed Pyrolysis Oil in the Presence of the Mixed Metal Oxide Catalyst In Example 2, the performance of the mixed metal oxide catalyst of Example 1 for upgrading mixed pyrolysis oil was evaluated. 16 grams of heavy pyrolysis oil as detailed in Table 1 and 4 grams of light pyrolysis oil as detailed in Table 2 were combined to form the mixed pyrolysis oil. The 20 grams of mixed pyrolysis oil and 5 grams of the mixed metal oxide catalyst of Example 1 were added to a batch reactor and mixed.

After adding the mixed pyrolysis oil and mixed metal oxide catalyst to the batch reactor under atmospheric pressure and at room temperature, the batch reactor was sealed. The batch reactor was purged with pure hydrogen gas three times. The pressure was then increased to 140 bar (14 MPa) by introducing pure hydrogen gas at room temperature. The mixed pyrolysis oil and mixed metal oxide catalyst were then heated to 400° C. and continuously stirred for four hours.

After the reaction, the batch reactor was cooled to room temperature. Then, the gas mixture was released and collected into a gas bag. The gas mixture was analyzed using gas chromatography. The reaction effluent was transferred to a separation unit (centrifuge). The reaction effluent was centrifuged at 10,000 revolutions per minute (rpm) for twenty minutes. Two layers were obtained after centrifuging, a top layer comprising the reaction product and a bottom layer comprising the used mixed metal oxide catalyst. The used mixed metal oxide catalyst was then washed with toluene to remove any condensate and vacuum dried. The used mixed metal oxide catalyst was vacuum dried at room temperature first and then at 100° C. The reaction product effluent was analyzed through simulated distillation (SIMDIS) gas chromatography, paraffins, isoparaffins, olefins, naphthenes, and aromatics (PIONA) gas chromatography, and high performance liquid chromatography (HPLC).

The mixed metal oxide catalyst of Example 1 demonstrated outstanding performance in hydro-cracking mixed pyrolysis oil into mono-aromatics and di-aromatic intermediate products. It will be appreciated that these mono-aromatic and di-aromatic products generated in Example 2, as well as in accordance with all embodiments of the present disclosure, may then be further selectively converted into BTEX using mesoporous zeolite supported metal catalysts as disclosed in U.S. Pat. No. 10,953,396, incorporated by reference in its entirety, or in accordance with any other method known to those skilled in the art.

Table 3 provides the reaction conditions, characteristics of the mixed pyrolysis oil, and characteristics of the reaction effluent.

TABLE 3

Reaction Conditions, Characteristics of Mixed Pyrolysis Oil, and Characteristics of Reaction Effluent

| Parameter | Value |
| --- | --- |
| Reaction Temperature (° C.) | 400 |
| Total Pressure Before Heating to Reaction Temperature (MPa) | 14 |
| Time on Stream (hours) | 4 |
| $C_{16}$ and $C_{16+}$ in Mixed Pyrolysis Oil (wt. %) | 27.0 |
| $C_{16}$ and $C_{16+}$ in Reaction Effluent (wt. %) | 4.07 |
| $C_{16}$ and $C_{16+}$ Conversion (%) | 84.93 |
| $H_2$ Conversion (%) | 27.79 |
| Gas Product Yield (wt. %) | 5.3 |
| Liquid Product Yield[1] (wt. %) | 72.83 |
| Mono-Aromatics ($C_6$-$C_9$) Yield (wt. %) | 34.53 |
| Di-Aromatics ($C_{10}$-$C_{13}$) Yield (wt. %) | 26.09 |
| Tri-Aromatics ($C_{14}$-$C_{16}$) Yield (wt. %) | 12.21 |
| Coke/Feed (%) | 0 |

As shown in Table 3, the mixed metal oxide catalyst was effective to convert 84.93 percent of the tetra-aromatics ($C_{16}$ and $C_{16+}$ hydrocarbons) in the mixed pyrolysis oil to mono-aromatics, di-aromatics, or tri-aromatics in a single step. Notably, the liquid product yield includes 34.53 wt. % mono-aromatics and 26.09 wt. % di-aromatics.

Table 4 provides a comparison between the composition of the mixed pyrolysis oil feed and the liquid reaction product effluent. The compositional comparison is also provided graphically with reference to FIG. 3.

TABLE 4

Composition of the mixed pyrolysis oil feed and the liquid reaction product effluent

| Component | Mixed Pyrolysis Oil Feed (wt. %) | Liquid Reaction Product Effluent (wt. %) |
| --- | --- | --- |
| Gas | 0.00 | 5.30 |
| BTEX | 2.09 | 4.60 |
| Iso-paraffin | 0.86 | 4.18 |
| Mono-Aromatics | 32.77 | 34.53 |
| Naphthalenes | 17.16 | 17.72 |
| Naphthenes | 0.18 | 1.04 |
| Olefins | 4.31 | 6.08 |
| Paraffin | 3.13 | 1.92 |
| Indenes | 6.50 | 8.37 |
| C14 to C15 Aromatics | 6.00 | 12.21 |
| C16 and C16+ Aromatics | 27.00 | 4.07 |

Figure 3:
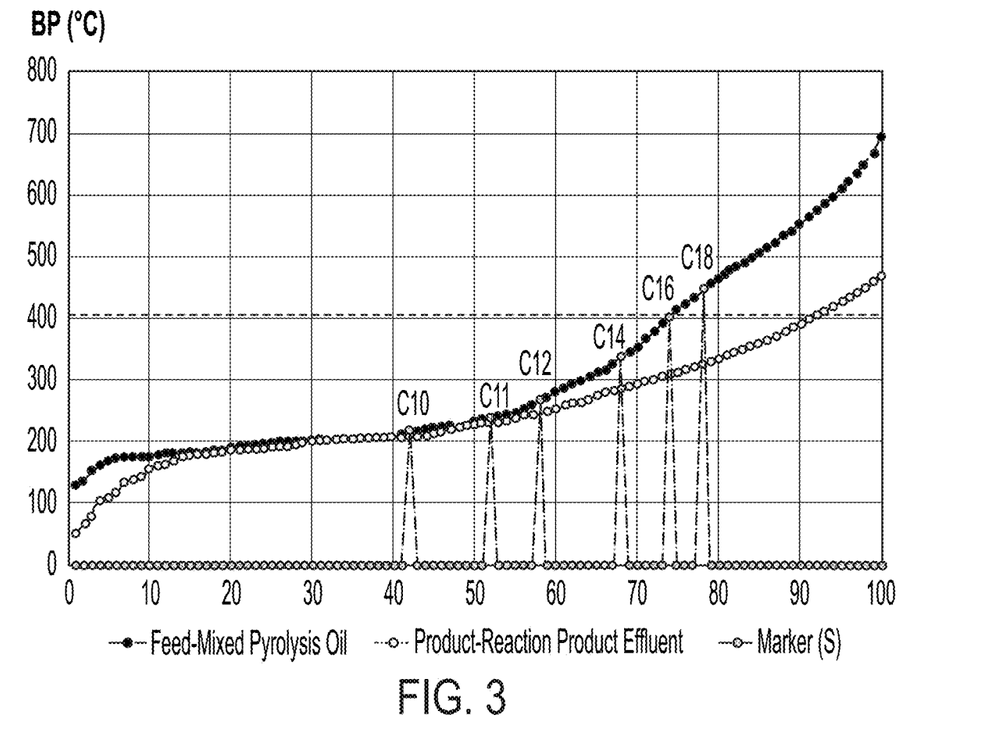
FIG. 3 graphically depicts the composition of the mixed pyrolysis oil before and after contacting the mixed pyrolysis oil with hydrogen in the presence of a mixed metal oxide catalyst according to one or more embodiments shown and described in this disclosure.

As shown in Table 4 and FIG. 3, the mixed metal oxide catalyst was effective in shifting the tetra-aromatics ($C_{16}$ and $C_{16+}$ hydrocarbons) to lighter components such as mono-aromatics in a single step.

It should now be understood the various aspects of the method for upgrading mixed pyrolysis oil and associated system for upgrading mixed pyrolysis oil are described and such aspects may be utilized in conjunction with various other aspects.

According to a first aspect, a method for upgrading mixed pyrolysis oil comprises contacting the mixed pyrolysis oil with hydrogen in the presence of a mixed metal oxide catalyst at reaction conditions to produce a reaction effluent comprising light aromatic compounds, where: the mixed pyrolysis oil is formed from light pyrolysis oil and heavy pyrolysis oil at a ratio of 10:90 to 40:60 with light pyrolysis oil representing a bottom stream of a gas steam cracker and heavy pyrolysis oil representing a bottom stream of a naphtha steam cracker; the mixed pyrolysis oil comprises multi-ring aromatic compounds; the mixed metal oxide catalyst comprises a plurality of catalyst particles and each of the plurality of catalyst particles comprises a plurality of metal oxides; and contacting the mixed pyrolysis oil with hydrogen in the presence of the mixed metal oxide catalyst at the reaction conditions converts at least a portion of the multi-ring aromatic compounds in the mixed pyrolysis oil to the light aromatic compounds.

A second aspect includes the method of the first aspect in which the mixed metal oxide catalyst comprises: from 60 wt. % to 95 wt. % iron oxide; from 1 wt. % to 20 wt. % zirconium oxide; from 0.1 wt. % to 10 wt. % cerium oxide; and from 1 wt. % to 20 wt. % aluminum oxide, where the weight percentages are based on the total weight of the mixed metal oxide catalyst.

A third aspect includes the method of the first or second aspect in which the mixed pyrolysis oil comprises greater than or equal to 30 weight percent (wt. %) multi-ring aromatic compounds having greater than or equal to sixteen carbon atoms based on the total weight of the mixed pyrolysis oil.

A fourth aspect includes the method of any of the first through third aspects in which contacting the mixed pyrolysis oil with hydrogen in the presence of the mixed metal oxide catalyst at the reaction conditions converts the portion of the multi-ring aromatic compounds in the mixed pyrolysis oil to the light aromatic compounds in a single step, without conducting a subsequent chemical reaction step.

A fifth aspect includes the method of any of the first through fourth aspects in which the method further comprises contacting the mixed pyrolysis oil with hydrogen in the presence of the mixed metal oxide catalyst in a pyrolysis upgrading unit to produce the reaction effluent.

A sixth aspect includes the method of any of the first through fifth aspects in which the method further comprises contacting the mixed pyrolysis oil with hydrogen in the presence of the mixed metal oxide catalyst at a temperature of from 300 degrees Celsius (° C.) to 500° C.

A seventh aspect includes the method of any of the first through sixth aspects in which the method further comprises contacting the mixed pyrolysis oil with hydrogen in the presence of the mixed metal oxide catalyst at a pressure of from 1 megapascal (MPa) (10 bar) to 20 MPa (200 bar).

An eighth aspect includes the method of any of the first through seventh aspects in which the light aromatic compounds comprise aromatic hydrocarbons having six to thirteen carbon atoms.

A ninth aspect includes the method of any of the first through eighth aspects in which the light aromatic compounds comprise benzene, toluene, ethylbenzene, xylene, or combinations of the same.

A tenth aspect includes the method of any of the first through ninth aspects in which contacting the mixed pyrolysis oil with hydrogen in the presence of the mixed metal oxide catalyst results in a yield of greater than or equal to 30 wt. % light aromatic compounds based on the total weight of the reaction effluent.

A eleventh aspect includes the method of any of the first through tenth aspects in which the method further comprises separating a gaseous constituent from the reaction effluent after contacting the mixed pyrolysis oil with hydrogen in the presence of the mixed metal oxide to yield a liquid portion of the reaction effluent.

A twelfth aspect includes the method of the eleventh aspect in which the method further comprises separating used mixed metal oxide catalyst in the liquid portion of the reaction effluent to yield a reaction product comprising light aromatic compounds.

A thirteenth aspect includes the method of the twelfth aspect in which the method further comprises separating the used mixed metal oxide catalyst in the liquid portion of the reaction effluent in a separation unit to yield the reaction product.

A fourteenth aspect includes the method of the thirteenth aspect in which the separation unit comprises a centrifuge.

A fifteenth aspect includes the method of any of the twelfth through fourteenth aspects in which the method further comprises washing and drying the used mixed metal oxide catalyst.

A sixteenth aspect includes the method of the fifteenth aspect in which contacting the mixed pyrolysis oil with hydrogen in the presence of the mixed metal oxide catalyst at the reaction conditions produces a condensate that may be deposited on the mixed metal oxide catalyst to produce the used mixed metal oxide catalyst, and the method further comprises washing the used mixed metal oxide catalyst with toluene to remove at least a portion of the condensate from the used mixed metal oxide catalyst.

A seventeenth aspect includes the method of the fifteenth or sixteenth aspect in which the method further comprises vacuum drying the used mixed metal oxide catalyst first at a temperature of from 20° C. to 30° C. and second at a temperature greater than 80° C.

According to an eighteenth aspect, a system for upgrading mixed pyrolysis oil includes a mixed pyrolysis oil stream; a pyrolysis oil upgrading unit in fluid communication with the mixed pyrolysis oil stream, where the pyrolysis oil upgrading unit comprises a mixed metal oxide catalyst, where: the mixed pyrolysis oil stream is formed from light pyrolysis oil and heavy pyrolysis oil at a ratio of 10:90 to 40:60 with light pyrolysis oil representing a bottom stream of a gas steam cracker and heavy pyrolysis oil representing a bottom stream of a naphtha steam cracker; the mixed metal oxide catalyst comprises a plurality of catalyst particles and each of the plurality of catalyst particles comprises a plurality of metal oxides; and the pyrolysis oil upgrading unit is operable to contact the mixed pyrolysis oil stream with hydrogen in the presence of the mixed metal oxide catalyst to produce a reaction effluent; and a separation unit disposed downstream of the pyrolysis oil upgrading unit and operable to separate a used mixed metal oxide catalyst from the reaction effluent to produce a reaction product comprising light aromatic compounds.

A nineteenth aspect includes the system of the eighteenth aspect in which the mixed metal oxide catalyst comprises: from 60 wt. % to 95 wt. % iron oxide; from 1 wt. % to 20 wt. % zirconium oxide; from 0.1 wt. % to 10 wt. % cerium oxide; and from 1 wt. % to 20 wt. % aluminum oxide, where the weight percentages are based on the total weight of the mixed metal oxide catalyst.

A twentieth aspect includes the system of the eighteenth or nineteenth aspect in which the mixed pyrolysis oil stream comprises greater than or equal to 30 weight percent (wt. %) multi-ring aromatic compounds having greater than or equal to sixteen carbon atoms based on the total weight of the mixed pyrolysis oil stream.

A twenty-first aspect includes the system of any of the eighteenth through twentieth aspects in which the pyrolysis oil upgrading unit contacts the mixed pyrolysis oil with hydrogen in the presence of the mixed metal oxide catalyst at a temperature of from 300 degrees Celsius (° C.) to 500° C.

A twenty-second aspect includes the system of any of the eighteenth through twenty-first aspects in which the pyrolysis oil upgrading unit contacts the mixed pyrolysis oil with hydrogen in the presence of the mixed metal oxide catalyst at a pressure of from 1 megapascal (MPa) (10 bar) to 20 MPa (200 bar).

A twenty-third aspect includes the system of any of the eighteenth through twenty-second aspects in which the light aromatic compounds comprise aromatic hydrocarbons having six to thirteen carbon atoms.

A twenty-fourth aspect includes the system of any of the eighteenth through twenty-third aspects in which the light aromatic compounds comprise benzene, toluene, ethylbenzene, xylene, or combinations of the same.

A twenty-fifth aspect includes the system of any of the eighteenth through twenty-fourth aspects in which contacting the mixed pyrolysis oil with hydrogen in the presence of the mixed metal oxide catalyst in the pyrolysis oil upgrading unit results in a yield of greater than or equal to 30 wt. % light aromatic compounds based on the total weight of the reaction effluent.

A twenty-sixth aspect includes the system of any of the eighteenth through twenty-sixth aspect in which the separation unit comprises a centrifuge.

A twenty-seventh aspect includes the system of any of the eighteenth through twenty-sixth aspects in which contacting the mixed pyrolysis oil with hydrogen in the presence of the mixed metal oxide catalyst in the pyrolysis oil upgrading unit at the reaction conditions produces a condensate that may be deposited on the mixed metal oxide catalyst to produce the used mixed metal oxide catalyst.

A twenty-eighth aspect includes the system of the twenty-seventh in which the system further comprises a used catalyst treatment unit downstream from the separation unit.

A twenty-ninth aspect includes the system of the twenty-eighth aspect in which the used catalyst treatment unit is operable to regenerate the used mixed metal oxide catalyst.

A thirtieth aspect includes the system of the twenty-eighth or twenty-ninth aspect in which the used catalyst treatment unit is operable to wash the used mixed metal oxide catalyst with toluene to remove at least a portion of the condensate from the used mixed metal oxide catalyst.

A thirty-first aspect includes the system of any of the twenty-eighth through thirtieth aspects in which the used catalyst treatment unit is operable to vacuum dry the used mixed metal oxide catalyst after washing.

A thirty-second aspect includes the system of the thirty-first aspect in which the vacuum drying of the used mixed metal oxide catalyst is completed first at a temperature of from 20° C. to 30° C. and second at a temperature greater than 80° C.

It should be apparent to those skilled in the art that various modifications and variations can be made to the described embodiments without departing from the spirit and scope of the claimed subject matter. Thus, it is intended that the specification cover the modifications and variations of the various described embodiments provided such modifications and variations come within the scope of the appended claims and their equivalents.

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced. For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated in this disclosure. That is, it is envisioned that each discrete value encompassed by the ranges are also included. Additionally, the ranges which may be formed by each discrete value encompassed by the explicitly disclosed ranges are equally envisioned. For brevity, the same is not explicitly indicated subsequent to each disclosed range and the present general indication is provided.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the claims appended hereto should be taken as the sole representation of the breadth of the present disclosure and the corresponding scope of the various embodiments described in this disclosure. Further, it will be apparent that modifications and variations are possible without departing from the scope of the appended claims.

What is claimed is:

1. A method for upgrading mixed pyrolysis oil, the method comprising;
   contacting the mixed pyrolysis oil with hydrogen in the presence of a mixed metal oxide catalyst at reaction conditions to produce a reaction effluent comprising light aromatic compounds, where:
   the mixed metal oxide catalyst comprises:
      from 60 wt. % to 95 wt. % iron oxide,
      from 1 wt. % to 20 wt. % zirconium oxide,
      from 0.1 wt. % to 10 wt. % cerium oxide, and
      from 1 wt. % to 20 wt. % aluminum oxide,
      where the weight percentages are based on the total weight of the mixed metal oxide catalyst
   the mixed pyrolysis oil is formed from light pyrolysis oil and heavy pyrolysis oil at a weight ratio of 10:90 to 40:60 with light pyrolysis oil representing a bottom stream of a gas steam cracker and heavy pyrolysis oil representing a bottom stream of a naphtha steam cracker;
   the mixed pyrolysis oil comprises multi-ring aromatic compounds;
   the mixed metal oxide catalyst comprises a plurality of catalyst particles and each of the plurality of catalyst particles comprises a plurality of metal oxides; and
   contacting the mixed pyrolysis oil with hydrogen in the presence of the mixed metal oxide catalyst at the reaction conditions converts at least a portion of the multi-ring aromatic compounds in the mixed pyrolysis oil to the light aromatic compounds.

2. The method of claim 1, in which the mixed pyrolysis oil comprises greater than or equal to 30 weight percent (wt. %) multi-ring aromatic compounds having greater than or equal to sixteen carbon atoms based on the total weight of the mixed pyrolysis oil.

3. The method of claim 1, where contacting the mixed pyrolysis oil with hydrogen in the presence of the mixed metal oxide catalyst at the reaction conditions converts the portion of the multi-ring aromatic compounds in the mixed pyrolysis oil to the light aromatic compounds in a single step, without conducting a subsequent chemical reaction step.

4. The method of claim 1, further comprising contacting the mixed pyrolysis oil with hydrogen in the presence of the mixed metal oxide catalyst in a pyrolysis upgrading unit to produce the reaction effluent.

5. The method of claim 1, further comprising contacting the mixed pyrolysis oil with hydrogen in the presence of the mixed metal oxide catalyst at a temperature of from 300 degrees Celsius (° C.) to 500° C.

6. The method of claim 1, further comprising contacting the mixed pyrolysis oil with hydrogen in the presence of the mixed metal oxide catalyst at a pressure of from 1 megapascal (MPa) (10 bar) to 20 MPa (200 bar).

7. The method of claim 1, where the light aromatic compounds comprise aromatic hydrocarbons having six to thirteen carbon atoms.

8. The method of claim 1, where the light aromatic compounds comprise benzene, toluene, ethylbenzene, xylene, or combinations of the same.

9. The method of claim 1, where contacting the mixed pyrolysis oil with hydrogen in the presence of the mixed metal oxide catalyst results in a yield of greater than or equal to 30 wt. % light aromatic compounds based on the total weight of the reaction effluent.

10. The method of claim 1, further comprising separating a gaseous constituent from the reaction effluent after contacting the mixed pyrolysis oil with hydrogen in the presence of the mixed metal oxide to yield a liquid portion of the reaction effluent.

11. The method of claim 10, further comprising separating used mixed metal oxide catalyst in the liquid portion of the reaction effluent to yield a reaction product comprising light aromatic compounds.

12. The method of claim 11, further comprising separating the used mixed metal oxide catalyst in the liquid portion of the reaction effluent in a separation unit to yield the reaction product.

13. The method of claim 12, where the separation unit comprises a centrifuge.

14. The method of claim 11, further comprising washing and drying the used mixed metal oxide catalyst.

15. The method of claim 14, where contacting the mixed pyrolysis oil with hydrogen in the presence of the mixed metal oxide catalyst at the reaction conditions produces a condensate that may be deposited on the mixed metal oxide catalyst to produce the used mixed metal oxide catalyst, and the method further comprises washing the used mixed metal oxide catalyst with toluene to remove at least a portion of the condensate from the used mixed metal oxide catalyst.

16. The method of claim 14, comprising vacuum drying the used mixed metal oxide catalyst first at a temperature of from 20° C. to 30° C. and second at a temperature greater than 80° C.

* * * * *